United States Patent
Tremblay et al.

(10) Patent No.: US 10,543,919 B2
(45) Date of Patent: Jan. 28, 2020

(54) AIRCRAFT CABIN AND PARTITION ASSEMBLY THEREFOR

(71) Applicant: BOMBARDIER INC., Dorval (CA)

(72) Inventors: Michel Tremblay, Laval (CA); Jenifer Tram, Laval (CA)

(73) Assignee: BOMBARDIER INC., Dorval (CA)

(*) Notice: Subject to any disclaimer, the term of this patent is extended or adjusted under 35 U.S.C. 154(b) by 213 days.

(21) Appl. No.: 15/736,532

(22) PCT Filed: Jun. 21, 2016

(86) PCT No.: PCT/IB2016/053687
§ 371 (c)(1),
(2) Date: Dec. 14, 2017

(87) PCT Pub. No.: WO2016/207792
PCT Pub. Date: Dec. 29, 2016

(65) Prior Publication Data
US 2018/0194472 A1    Jul. 12, 2018

Related U.S. Application Data

(60) Provisional application No. 62/184,313, filed on Jun. 25, 2015.

(51) Int. Cl.
*B64C 1/10* (2006.01)
*B64D 11/00* (2006.01)
*B64C 1/14* (2006.01)

(52) U.S. Cl.
CPC ............ *B64D 11/0023* (2013.01); *B64C 1/10* (2013.01); *B64C 1/1438* (2013.01)

(58) Field of Classification Search
CPC ....... B64C 1/10; B64C 1/1438; B64C 1/1461; B64D 11/0023; B64D 2011/0046
See application file for complete search history.

(56) References Cited

U.S. PATENT DOCUMENTS 5,816,534 A    10/1998    Schumacher
6,186,444 B1   2/2001     Steel
(Continued)

FOREIGN PATENT DOCUMENTS

WO    2011092640    8/2011
WO    2014027215    2/2014

OTHER PUBLICATIONS

International Search Report and Written Opinion, issued in PCT application No. PCT/IB2016/053687, dated Nov. 17, 2016.

*Primary Examiner* — Richard G Davis
(74) *Attorney, Agent, or Firm* — Norton Rose Fulbright Canada LLP

(57) ABSTRACT

A partition assembly (16) for an aircraft cabin, including a bulkhead (18) with first (28) and second (30) internal compartments having respective first (32) and second (34) open ends defined in a same side of the bulkhead (18), one of the compartments being located aft of the other, a sliding door (36) slidingly supported within the first compartment (28) and slidable out of the first compartment (28) through the first open end (32), and a curtain (42) slidingly engaged to a curtain rail (40), the curtain receivable in the second compartment (30) and slidable along the curtain rail (40) out of the second compartment (30) through the second open end (34). An aircraft curtain rail is also described where the curtain rail and curtain track each have a non-rectilinear profile when viewed in a first plane and when viewed in a second plane perpendicular to the first plane. A method of manufacturing a curtain rail is also discussed.

14 Claims, 6 Drawing Sheets

(56) References Cited

U.S. PATENT DOCUMENTS

| | | |
|---|---|---|
| 7,530,529 B2 | 5/2009 | Bock |
| 8,123,165 B2 | 2/2012 | Breuer et al. |
| 8,684,308 B2 | 4/2014 | Warner et al. |
| 8,756,760 B2 | 6/2014 | Ulbrich-Gasparevic et al. |
| 2009/0242149 A1 | 10/2009 | Breuer et al. |
| 2013/0111835 A1 | 5/2013 | Harter et al. |
| 2014/0158310 A1 | 6/2014 | Slyter et al. |

AIRCRAFT CABIN AND PARTITION ASSEMBLY THEREFOR

CROSS-REFERENCE TO RELATED APPLICATIONS

This application claims priority from U.S. provisional application No. 62/184,313 filed Jun. 25, 2015, the entire contents of which are incorporated by reference herein.

TECHNICAL FIELD

The application relates generally to aircraft cabins and, more particularly, to partitions assemblies for such cabins.

BACKGROUND OF THE ART

Aircraft cabins are typically partitioned using either hard doors or curtains, for example to separate the different classes of seating. Although a hard door may provide for a better separation between sections of cabins as compared to a curtain, use of a hard door to partition the aircraft may be undesirable or even prohibited in some situations. As a non-limiting example, according to some current regulations, separation of the cabin by a hard door is prohibited for commercial flights but permissible for private flights.

For aircraft that are alternately used in situations where a hard door is permissible and in situations where it is not, it is known to have a removable curtain that is installed in the cabin to provide the partition when the hard door cannot be used, and removed from the cabin when the hard door can be used. However, such an installation and removal process may increase the time and costs of maintenance of the aircraft.

SUMMARY

In one aspect, there is provided a partition assembly for an aircraft cabin, the assembly comprising: a bulkhead including first and second internal compartments with one of the first and second compartments being located aft of the other, the first and second compartments having respective first and second open ends defined in a same side of the bulkhead; a sliding door slidingly supported within the first compartment and slidable out of the first compartment through the first open end; and a curtain slidingly engaged to a curtain rail, the curtain receivable in the second compartment and slidable along the curtain rail out of the second compartment through the second open end.

The sliding door may be slidable between a retracted position where the sliding door is completely contained in the first compartment and an extended position where the sliding door extends out of the first compartment through the first open end.

The curtain may be slidable between a retracted position where the curtain is completely contained in the second compartment and an extended position where the curtain extends out of the second compartment through the second open end.

The assembly may further comprise a second bulkhead spaced laterally from the side of the first bulkhead including the first and second open ends, a passageway defined between the first and second bulkheads, with the curtain rail extending between the first and second bulkheads, the sliding door slidable to an extended door position where the sliding door has one end adjacent the first compartment and an opposed end adjacent the second bulkhead to close the passageway, and the curtain slidable to an extended curtain position where the curtain has one end adjacent the second compartment and an opposed end adjacent the second bulkhead to close the passageway. The assembly may further comprise front and aft ceiling panels respectively adjacent front and aft walls of the first bulkhead, and the front and aft ceiling panels may extend between the first and second bulkheads with the curtain rail extending between the front and aft ceiling panels. The curtain door in the extended curtain position and the sliding door in the extended door position may contact a same portion of the second bulkhead. The same portion may be aligned with the sliding door such that the curtain in the extended curtain position extends between the first and second bulkheads at a non-zero angle with respect to a lateral direction of the aircraft cabin.

The curtain may be non-parallel to the sliding door when extended out of the second compartment.

The curtain rail may have a first elongated portion extending within the second compartment and a second elongated portion extending out of the second compartment, the first elongated portion including a first part of a curtain track slidingly engaging the curtain and the second elongated portion including a second part of the curtain track, the first elongated portion and the first part of the curtain track extending at a non-zero angle with respect to the second elongated portion and the second part of the curtain track, respectively, when viewed in a plane perpendicular to a vertical direction of the aircraft cabin. The first and second elongated portions may be linear when viewed in the plane perpendicular to the vertical direction and may be interconnected by an intermediate portion which is curved when viewed in the plane perpendicular to the vertical direction, the intermediate portion including a curved part of the curtain track interconnecting the first and second parts of the curtain track. The first and second elongated portions of the curtain rail and the first and second parts of the curtain track may be curved when viewed in a plane perpendicular to a longitudinal direction of the aircraft cabin. The first and second elongated portions of the curtain rail and the first and second parts of the curtain track may be arcuate when viewed in the plane perpendicular to the longitudinal direction.

The curtain rail and a curtain track defined therein slidingly engaging the curtain may be curved when viewed in a plane perpendicular to a longitudinal direction of the aircraft cabin. The curtain rail and curtain track may be arcuate when viewed in the plane perpendicular to the longitudinal direction.

In another aspect, there is provided an aircraft cabin comprising: an interior ceiling structure having a non-rectilinear profile when viewed in a first plane perpendicular to a longitudinal direction of the aircraft cabin; and a curtain rail mounted to the ceiling structure and defining a curtain track for slidingly receiving curtain attachment members, the curtain rail and curtain track each having a non-rectilinear profile when viewed in the first plane, the non-rectilinear profile of the curtain rail being complementary to the non-rectilinear profile of the ceiling structure; wherein the curtain rail and curtain track also have a non-rectilinear profile when viewed in a second plane perpendicular to a vertical direction of the aircraft cabin.

The curtain track and/or curtain rail may be curved when viewed in the first plane. The curtain track and/or curtain rail may define an arc of circle when viewed in the first plane.

The curtain rail may have first and second elongated portions, the first elongated portion including a first part of the curtain track and the second elongated portion including a second part of the curtain track, the first elongated portion and first part of the curtain track extending at a non-zero angle with respect to the second elongated portion and second part of the curtain track when viewed in the second plane. The first and second elongated portions may be linear when viewed in the second plane and may be interconnected by an intermediate portion which is curved when viewed in the second plane, the intermediate portion including a curved part of the curtain track interconnecting the first and second parts of the curtain track. The first and second elongated portions of the curtain rail and the first and second parts of the curtain track may be curved when viewed in the first plane. The first and second elongated portions of the curtain rail and the first and second parts of the curtain track may be arcuate when viewed in the first plane. The interior ceiling structure may include front and aft ceiling panels having ends connectable to side walls of the cabin, the curtain rail extending between and connected to the front and aft ceiling panels.

In another aspect, there is provided a curtain rail for an aircraft, the curtain rail comprising: first and second elongated portions, the first elongated portion including a first part of a curtain track and the second elongated portion including a second part of the curtain track, the curtain track configured for slidingly receiving curtain attachment members therein; wherein the first and second elongated portions of the curtain rail and the first and second parts of the curtain track are curved when viewed in a first plane; and wherein the first elongated portion and the first part of the curtain track extend at a non-zero angle with respect to the second elongated portion and the second part of the curtain track, respectively, when viewed in a second plane perpendicular to the first plane.

The curtain track may define an arc of circle when viewed in the first plane. The first and second elongated portions of the curtain rail may each define an arc of circle when viewed in the first plane. The first and second elongated portions of the curtain rail may define a common continuous arc of circle when viewed in the first plane.

The first and second elongated portions may be linear when viewed in the second plane and may be interconnected by an intermediate portion which is curved when viewed in the second plane, the intermediate portion including a curved part of the curtain track interconnecting the first and second parts of the curtain track.

The curtain rail may have a C-shaped cross-section.

In a further aspect, there is provided a method of manufacturing a curtain rail, comprising: machining first and second elongated portions from a monolithic block of material, the first elongated portion being machined to include a first part of a curtain track and the second elongated portion being machined to include a second part of the curtain track; wherein the first and second elongated portions of the curtain rail and the first and second parts of the curtain track are machined to be curved when viewed in a first plane; and wherein the first elongated portion and the first part of the curtain track are machined to extend at a non-zero angle with respect to the second elongated portion and the second part of the curtain track when viewed in a second plane perpendicular to the first plane.

DESCRIPTION OF THE DRAWINGS

Reference is now made to the accompanying figures in which.

DETAILED DESCRIPTION

Figure 1:
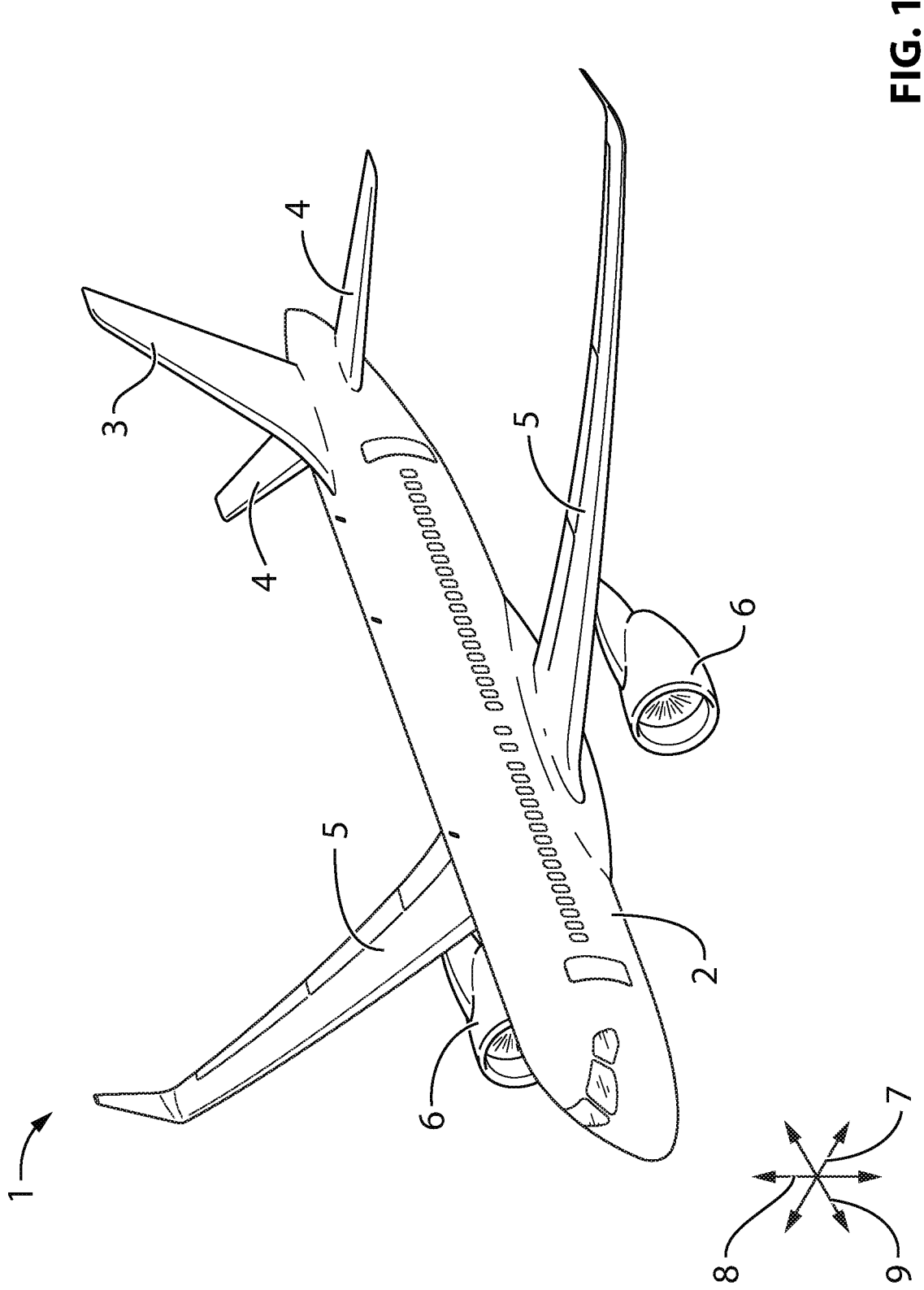
FIG. 1 is a schematic tridimensional view of an aircraft according to a particular embodiment.

Referring to the drawings and more particularly to FIG. 1, an aircraft is shown at 1, and is generally described to illustrate some components for reference purposes in the present disclosure. The aircraft 1 has a fuselage 2 having a fore end at which a cockpit is located, and an aft end supporting a tail assembly, with the cabin generally located between the cockpit and the tail assembly. The tail assembly comprises a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 5 project laterally from the fuselage. The aircraft 1 has engines 6 supported by the wings 5, although the engines 6 could also be mounted to the fuselage 2. The aircraft 1 is shown as a jet-engine aircraft, but may also be a propeller aircraft.

The aircraft and aircraft cabin generally define three perpendicular directions corresponding to the principal axes of the aircraft: a lateral direction 7 corresponding to the lateral or pitch axis, a vertical direction 8 corresponding to the vertical or yaw axis, and a longitudinal direction 9 corresponding to the longitudinal or roll axis.

Figure 2:
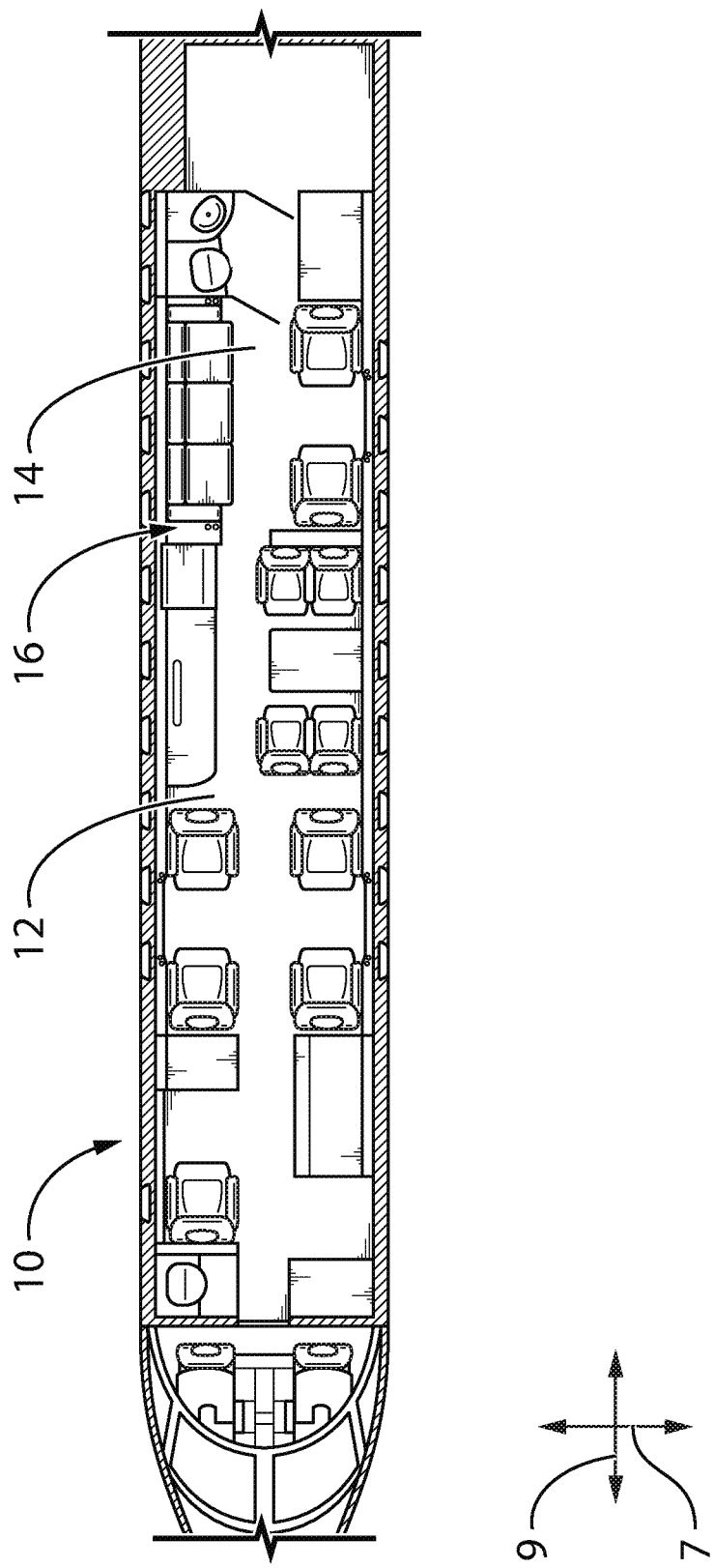
FIG. 2 is a schematic top view of a cabin of an aircraft.

Referring to FIG. 2, an example interior layout of an aircraft cabin 10 is shown. It can be seen that in this example, the cabin includes a front section 12 and an aft section 14, and a partition assembly generally shown at 16 extending therebetween. It is understood that the configuration of the cabin 10 may vary, including, but not limited to, the position and quantity of partition assemblies 16 provided. For example, the cabin may be partitioned in three or more sections by two or more partition assemblies.

Figure 3:
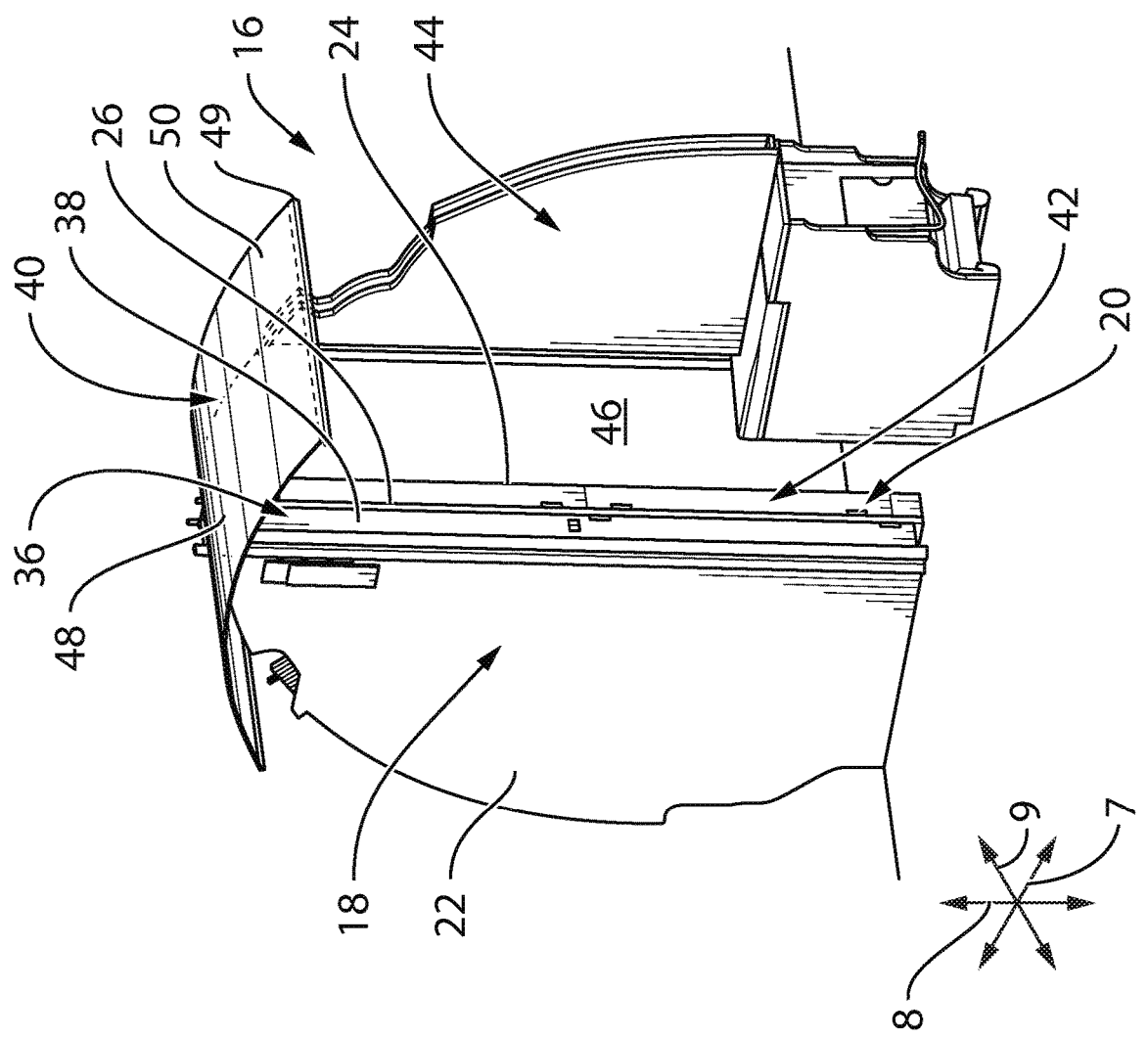
FIG. 3 is a schematic tridimensional view of a partition assembly in accordance with a particular embodiment, which may be used in an aircraft such as shown in FIG. 1.
Figure 4:
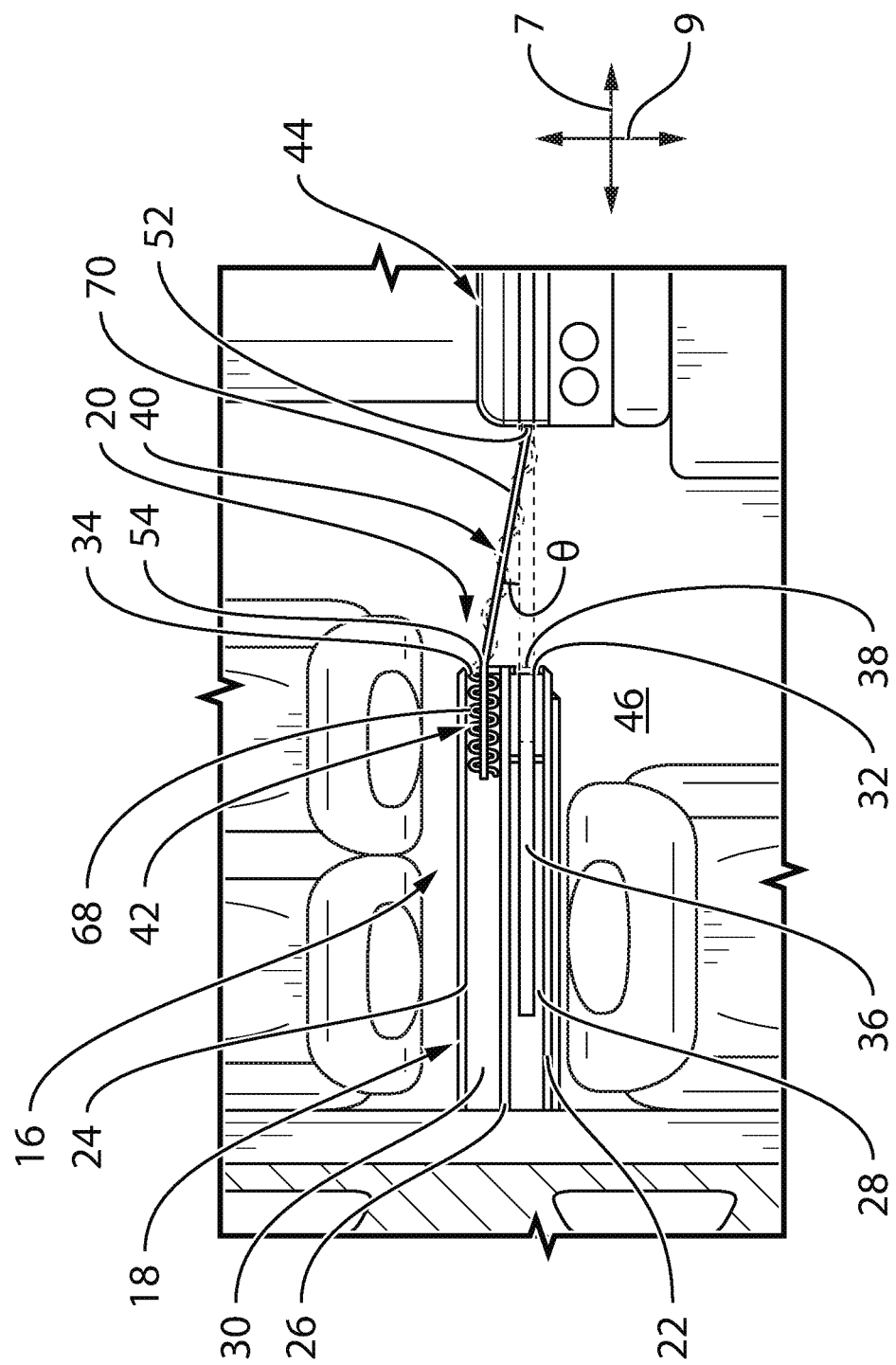
FIG. 4 is a schematic top view of the partition assembly of FIG. 3.

Referring to FIGS. 3-4, a partition assembly 16 according to a particular embodiment is shown. The assembly 16 includes a bulkhead 18 generally extending from a floor surface to an interior ceiling structure of the cabin 10. The bulkhead 18 has an open side 20. The bulkhead 18 includes an aft wall 22, a front wall 24, and an intermediate wall 26 extending within the bulkhead 18 spaced from the aft and front walls 22, 24. The aft, front and intermediate walls 22, 24, 26 are parallel to one another. It is understood that each of the walls 22, 24, 26 may have any structural configuration suitable for use in an aircraft, including, but not limited to, a structural configuration including multiple interconnected elements and/or multiple layers of materials. For example, one or more of the walls 22, 24, 26 may include a skin panel and a plurality of reinforcement members attached to the skin panel. Other configurations are also possible.

Referring more particularly to FIG. 4, a first internal compartment 28 is defined in the bulkhead 18 between the aft and intermediate walls 22, 26, and a second internal compartment 30 is defined in the bulkhead 18 between the front and intermediate walls 24, 26. Each of the compartments 28, 30 has a respective open end 32, 34 defined by the open side 20 of the bulkhead. The two open ends 32, 34 are separated from one another by the edge of the intermediate wall 26.

Although not shown, the bulkhead 18 may include additional compartments, in front of the first and second compartments 28, 30, aft of the first and second compartments 28, 30, within the aft, front and/or intermediate wall 22, 24, 26, and/or to the side of the first and second compartments 28, 30 opposite the open side 20, for example to receive stowable equipment or to contain aircraft systems. Although the aft and front walls 22, 24 are shown as external walls of the bulkhead 18, it is understood that the bulkhead 18 may include additional structure aft of the aft wall 22 and/or in front of the front wall 24, such that the front wall 24 and/or the aft wall 22 is/are internal wall(s) of the bulkhead 18.

Still referring to FIG. 4, the assembly 16 further includes a sliding door 36 slidingly supported within the first compartment 28 such as to be slidable out of the first compartment 28 through its open end 32. The sliding door 36 may be mounted on any type of appropriate support allowing the desired sliding movement, and may include any structure and material suitable for use in an aircraft. In a particular embodiment the sliding door 36 is electrically controlled and mounted on the intermediate wall 26 in the compartment 28, with a piston controlling the extension of the sliding door 36 out of the compartment 28 and maintaining it in the extended position when required, and storage compartments are provided in the second compartment 30 to allow lap trays and monitors storage. Other configurations are also possible.

The sliding door 36 is thus slidable between a retracted door position (shown in full lines) where it is in the first compartment 28 and an extended door position (shown in dotted lines) where it extends out of the first compartment 28 through the open end 32. The sliding door 36 in the retracted position is preferably completely contained within the first compartment 28; in the embodiment shown, the edge 38 of the sliding door 36 is sized to substantially close the open end 32 of the first compartment 28 when the door 36 is in the retracted position. The sliding door 36 in the extended position still extends in part within the first compartment 28, through the engagement with its support located in the first compartment 28.

Still referring to FIG. 4, the assembly 16 includes a curtain rail 40 mounted on the ceiling structure of the aircraft cabin 10 adjacent the bulkhead 18. The curtain rail 40 extends partly within the second compartment 30 and partly out of the second compartment 30, and defines a curtain track, for example opening on the bottom surface of the curtain rail.

The assembly further includes a curtain 42 slidingly engaged to the curtain rail 40 such as to be slidable out of the second compartment 30 through its open end 34. The curtain 42 may be engaged to the curtain rail 40 through sliding engagement of any appropriate type of attachment members (examples of which are described further below) within the curtain track, and may be made of any material suitable for use in an aircraft. In a particular embodiment, the curtain 42 is an acoustic curtain, including material(s) having soundproof characteristics. Other configurations are also possible.

The curtain 42 is thus slidable between a retracted curtain position (shown in full lines) where it is folded and received in the second compartment 30, and preferably completely contained therein, and an extended curtain position (shown in dotted lines) where it extends out of the second compartment 30 through its open end 34. The curtain 42 in the extended position may have one end remaining within the second compartment 30.

The particular assembly shown further comprises a second bulkhead 44 spaced laterally from the open side 20 of the first bulkhead 18, such that a passageway 46 is defined between the first and second bulkheads 18, 44. The open ends 32, 34 of the first and second compartments 28, 30 open into this passageway 46. The curtain rail 40 extends to the second bulkhead 44, and in a particular embodiment is connected thereto. The sliding door 36 and the curtain 42 in their extended positions have one end adjacent (e.g. remaining in and/or connected to) their respective compartment 28, 30 and an opposed end adjacent the second bulkhead 44, for example in abutment therewith, to close the passageway 46. It is understood that the assembly 16 may alternately be used to close a passageway defined between the bulkhead 18 and any other appropriate type of structure, including, but not limited to, a wall of the cabin or a cabinet.

Although the sliding door 36 has been depicted as positioned behind the curtain 42 within the bulkhead 18, it is understood that alternately the sliding door 36 may be received in the second compartment 30 and the curtain in the first compartment 28 such that the curtain 42 is positioned behind the sliding door 36 within the bulkhead 18.

The first and/or second bulkhead 18, 44 may include suitable mechanisms for latching the sliding door 36 and/or engaging the curtain 42 in their extended position, including, but not limited to, an electric latch system for the door on the first bulkhead 18, and/or a magnetic engagement for the curtain and/or door end abutted therewith on the second bulkhead 44.

Referring to FIG. 3, in the embodiment shown, the assembly 16 further includes an aft ceiling panel 48 supported on the ceiling structure between the two bulkheads 18, 44 and extending adjacent the aft walls of the bulkheads 18, 44, and a front ceiling panel 50 supported on the ceiling structure between the two bulkheads 18, 44 and extending adjacent the front walls of the bulkheads 18, 44. The two ceiling panels 48, 50 are in close proximity to one another between the two bulkheads 18, 44, and the curtain rail 40 extends between the ceiling panels 48, 50. In a particular embodiment, the curtain rail 40 is mounted on the ceiling structure through attachment with the ceiling panels 48, 50, which are connected to side walls of the aircraft along side attachment tracks 49 on each end, leaving the ceiling panels 48, 50 free to move and deform along their center portion. Other configurations are also possible.

The assembly 16 allows for a sliding door and curtain to be both provided in the aircraft to close a same passageway, such that the desired partition may be selected, for example in accordance with regulations associated with the particular flight.

In the particular embodiment shown, and as can be seen in FIG. 4, the curtain and the sliding door in their extended positions contact a same portion of the second bulkhead 44, such that the sliding door 36 in its extended position extends under part of the curtain rail 40.

The portion 52 of the second bulkhead 44 contacted by the curtain 42 and sliding door 36 is defined as a partition extremity aligned with the sliding door 36 deployed from the first compartment 28. The sliding door 36 extends along the lateral direction 7, and the curtain 42 in its extended position extends at a non-zero angle θ with respect to the sliding door 36, and to the lateral direction 7. The extended curtain 42 is thus non-parallel to the sliding door 36. The curtain rail 40 and curtain track defined therein thus extend between a first location 54 on the first bulkhead 18 and a second location 52 on the second bulkhead 44 which is offset along the longitudinal direction 9 with respect to the first location 54.

Figure 5:
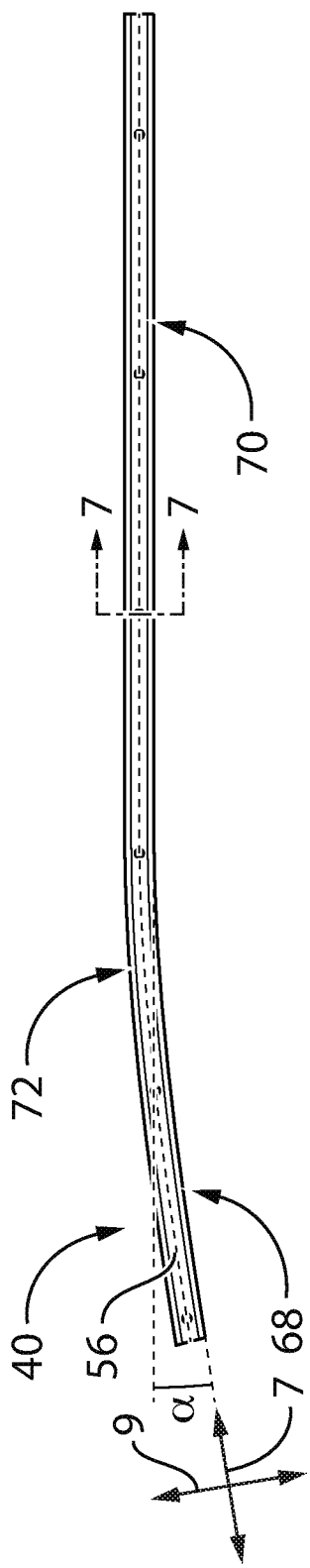
FIG. 5 is a schematic bottom view of a curtain rail in accordance with a particular embodiment, which may be used in the partition assembly of FIG. 3.
Figure 6:
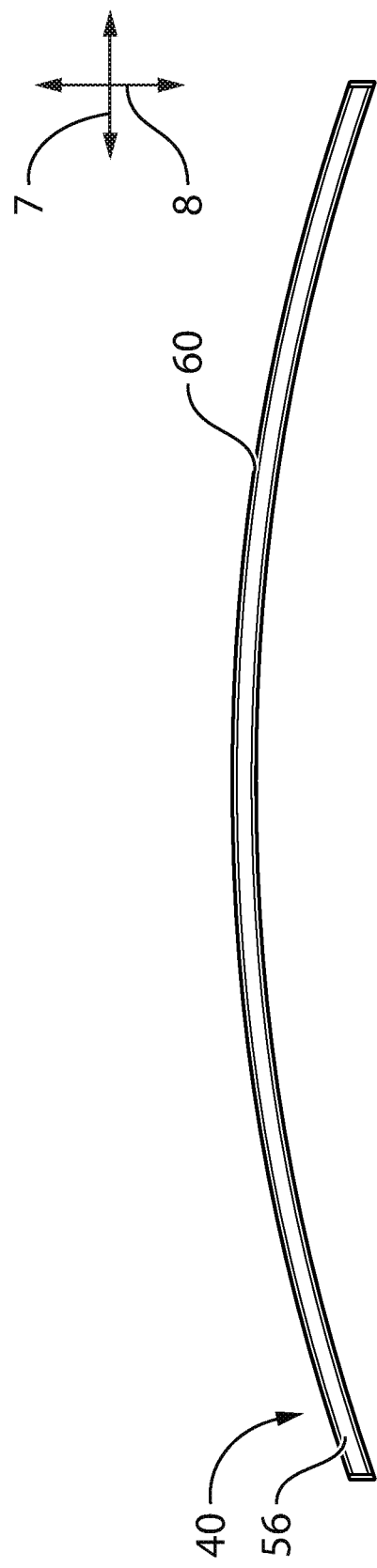
FIG. 6 is a schematic front view of the curtain rail of FIG. 5.
Figure 7:
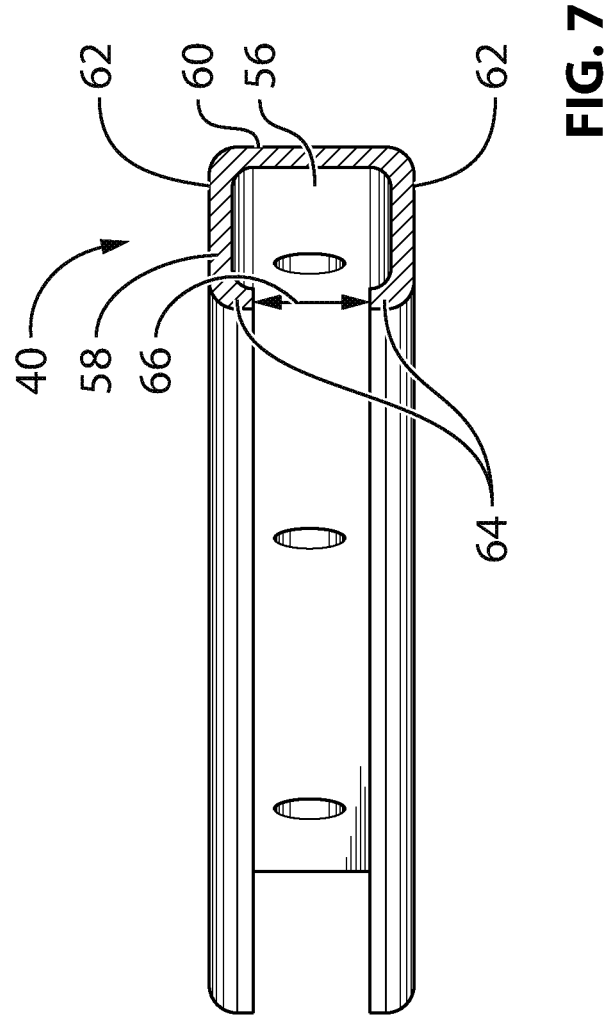
FIG. 7 is a schematic cross-sectional view of the curtain rail taken along lines 7-7 of FIG. 5.

Referring to FIGS. 5-7, a curtain rail 40 according to a particular embodiment of the present invention is shown. In the embodiment shown, the curtain rail 40 has a constant cross-sectional shape across its length, so that the profile of the curtain track 56 follows the profile of the curtain rail 40. As can be seen more clearly in FIG. 7, the curtain rail 40 has a C-shaped cross section formed by a wall 58 defining a top surface 60 and front and rear surfaces 62 of the curtain rail 40. The C-shaped wall 58 encloses the curtain track 56, and also defines front and rear edge portions 64 of the bottom surface of the curtain rail 40 between which is defined the opening 66 of the curtain track 56. It is understood that other cross-sectional shapes for the curtain rail 40 are also possible, including, but not limited to, I and T shaped cross-sections.

As can be seen from FIG. 5, the curtain rail 40 includes first and second elongated portions 68, 70, with the curtain track 56 being continuously defined in the two portions 68, 70. The first elongated portion 68 is received within the second compartment 30 (see FIG. 4) and the second elongated portion 70 extends out of it. When viewed in a plane parallel to the floor surface of the cabin 10, which can also be defined as perpendicular to the vertical direction 8 (such as the plane of each of FIGS. 4-5), the first elongated portion 68 and the part of the curtain track 56 defined therein extend at a non-zero angle α with respect to the second elongated portion 70 and the part of the curtain track 56 defined therein. In the embodiment shown, the two elongated portions 68, 70 are interconnected by an intermediate portion 72 which is curved when viewed in the plane perpendicular to the vertical direction 8. The part of the curtain track 56 defined in the intermediate portion 72 is also curved. In a particular embodiment, the intermediate portion 72 of the curtain rail and the part of the curtain track 56 defined therein are arcuate when viewed in the plane perpendicular to the vertical direction 8, i.e. they have a profile of an arc of a circle with a constant radius. Other configurations are of course possible, provided the profile of the curtain track 56 changes direction sufficiently progressively along its length such as to allow the curtain attachment members to slide smoothly therein.

When viewed in a plane perpendicular to the longitudinal direction 9 (such as the plane of FIG. 6), the curtain rail 40 and curtain track 56 are also non rectilinear or curved, such that the top surface 60 of the curtain rail 40 conforms to a non rectilinear ceiling structure of the cabin 10. In the embodiment shown, the curtain rail 40 and curtain track 56 are arcuate when viewed in the plane perpendicular to the longitudinal direction 9, i.e. the two elongated portions 68, 70 have a profile following a common, continuous arc of circle with a constant radius. This configuration allows for the top surface 60 of the curtain rail 40 to be complementary to an arcuate ceiling structure for attachment thereto.

The curtain rail 40 and curtain track 56 are thus non-rectilinear when viewed in two perpendicular planes, or in other words have sections extending at different angles from one another (curved or angled) along three perpendicular axes. In the example shown, the curtain rail 40 and curtain track 56 each have a non-rectilinear profile both when viewed in the plane perpendicular to the longitudinal direction 9 and in the plane perpendicular to the vertical direction 8.

In a particular embodiment, the curtain rail 40 and curtain track 56 defined therein are manufactured by machining of a monolithic block of material; in some embodiments, machining may provide for an increased flexibility in possible variations of profiles and/or cross-sectional shapes for the curtain rail 40, and/or tighter tolerances, when compared to bending of a straight curtain rail.

Figure 8:
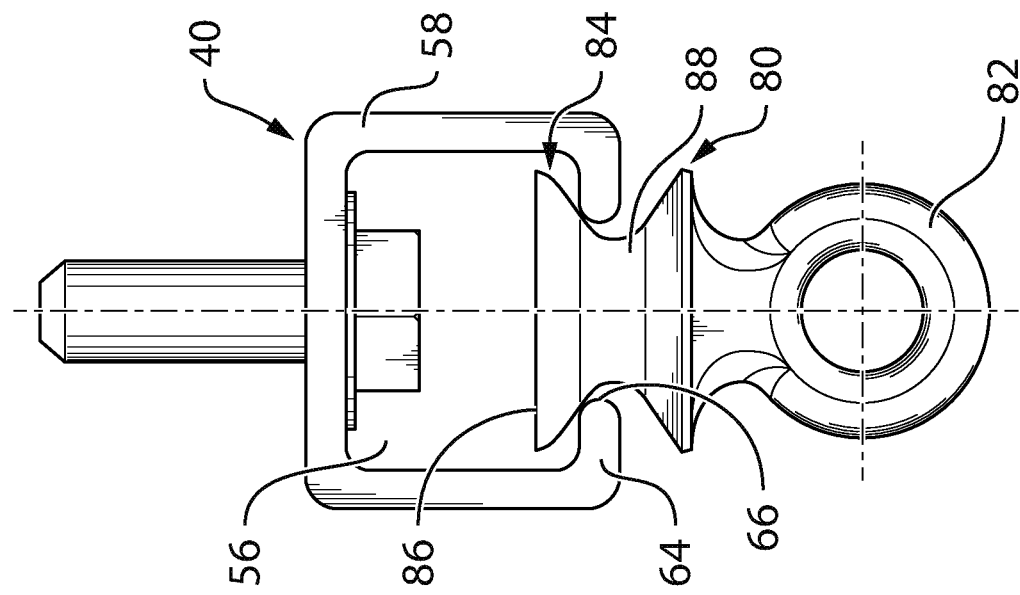
FIG. 8 is a schematic side view of a curtain attachment member in accordance with a particular embodiment, which may be used to slidingly engage a curtain with the curtain rail of FIG. 5.

Referring to FIG. 8, a curtain attachment member 80 in accordance with a particular embodiment is shown, which may be used to slidingly engage the curtain 42 within the curtain track 56. Although a single attachment member is shown, it is understood that multiple attachment members are provided in connection with a top portion of the curtain 42, spaced along the length of the curtain. Each attachment member 80 includes a bottom loop 82 for engagement with the curtain, and a head 84 extending from the bottom loop 82. The head 84 includes an enlarged portion 86 having a maximum lateral cross-sectional greater than the spacing between the front and rear edge portions 64 of the bottom surface of the curtain rail 40; the enlarged portion 86 is thus sized such as be prevented from passing through the opening 66 of the curtain track 56. The enlarged portion 86 is connected to the bottom loop 82 by an engagement portion 88 which is sized to be received between the front and rear edge portions 64 of the bottom surface of the curtain rail 40. In the embodiment shown, the engagement portion 88 has an hourglass-shaped profile. The head 84 and engagement portion 88 are axisymmetric. The curtain rail 40 has at least one open end, and the enlarged portion 86 is inserted into the curtain track 56 from the open end.

It is understood that the particular attachment member 80 shown is an example only, and that any other appropriate type of attachment member may be used.

In a particular embodiment, the attachment members 80 are made of nylon and the curtain rail 40 is made of aluminium with an appropriate surface roughness (e.g. √32). Other configurations are also possible.

A suitable lubricant may be provided in the curtain track 56 to facilitate the sliding movement of the attachment members 80 therein.

It is understood that the partition assembly 16 including the bulkhead 18 receiving the sliding door 36 and curtain 42 may be used in embodiments where the curtain 42 and sliding door 36 extend out of their respective compartment parallel to one another, for example with a curtain rail that is rectilinear, or curved only in the plane perpendicular to the longitudinal direction 9; the partition assembly 16 including the bulkhead 18 receiving the sliding door 36 and curtain 42 may also be used with a curtain rail having a different profile than that shown, for example curved or angled in only one plane. Moreover, the curtain rail 40 and curtain track 56 which are non-rectilinear when viewed in two perpendicular planes may be used without being combined with a sliding door 36, for example when a particular structure in an aircraft cabin requires the curtain 42 to extend at a non-zero angle with respect to the lateral direction 7.

It is understood that any combination or sub-combination of the elements of the different embodiments is within the scope of this disclosure. While the methods and systems described herein have been described and shown with reference to particular steps performed in a particular order, it will be understood that these steps may be combined, sub-divided or reordered to form an equivalent method without departing from the teachings of the present invention. Accordingly, the order and grouping of the steps is not a limitation of the present invention.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The invention claimed is:

1. A partition assembly for an aircraft cabin, the assembly comprising:
   a bulkhead including first and second internal compartments with one of the first and second compartments being located aft of the other, the first and second compartments having respective first and second open ends defined in a same side of the bulkhead;
   a sliding door slidingly supported within the first compartment and slidable out of the first compartment through the first open end; and
   a curtain slidingly engaged to a curtain rail, the curtain receivable in the second compartment and slidable along the curtain rail out of the second compartment through the second open end.

2. The assembly as defined in claim 1, wherein the sliding door is slidable between a retracted position where the sliding door is completely contained in the first compartment and an extended position where the sliding door extends out of the first compartment through the first open end.

3. The assembly as defined in claim 1, wherein the curtain is slidable between a retracted position where the curtain is completely contained in the second compartment and an extended position where the curtain extends out of the second compartment through the second open end.

4. The assembly as defined in claim 1, wherein the bulkhead is a first bulkhead, the assembly further comprising a second bulkhead spaced laterally from the side of the first bulkhead including the first and second open ends, a passageway being defined between the first and second bulkheads, the curtain rail extending between the first and second bulkheads, the sliding door slidable to an extended door position where the sliding door has one end adjacent the first compartment and an opposed end adjacent the second bulkhead to close the passageway, the curtain slidable to an extended curtain position where the curtain has one end adjacent the second compartment and an opposed end adjacent the second bulkhead to close the passageway.

5. The assembly as defined in claim 4, further comprising front and aft ceiling panels respectively adjacent front and aft walls of the first bulkhead, the front and aft ceiling panels extending between the first and second bulkheads, the curtain rail extending between the front and aft ceiling panels.

6. The assembly as defined in claim 4 or 5, wherein the curtain door in the extended curtain position and the sliding door in the extended door position contact a same portion of the second bulkhead.

7. The assembly as defined in claim 6, wherein the same portion is aligned with the sliding door such that the curtain in the extended curtain position extends between the first and second bulkheads at a non-zero angle with respect to a lateral direction of the aircraft cabin.

8. The assembly as defined in claim 1, wherein the curtain is non-parallel to the sliding door when extended out of the second compartment.

9. The assembly as defined in claim 1, wherein the curtain rail has a first elongated portion extending within the second compartment and a second elongated portion extending out of the second compartment, the first elongated portion including a first part of a curtain track slidingly engaging the curtain and the second elongated portion including a second part of the curtain track, the first elongated portion and the first part of the curtain track extending at a non-zero angle with respect to the second elongated portion and the second part of the curtain track, respectively, when viewed in a plane perpendicular to a vertical direction of the aircraft cabin.

10. The assembly as defined in claim 9, wherein the first and second elongated portions are linear when viewed in the plane perpendicular to the vertical direction and interconnected by an intermediate portion which is curved when viewed in the plane perpendicular to the vertical direction, the intermediate portion including a curved part of the curtain track interconnecting the first and second parts of the curtain track.

11. The assembly as defined in claim 9, wherein the first and second elongated portions of the curtain rail and the first and second parts of the curtain track are curved when viewed in a plane perpendicular to a longitudinal direction of the aircraft cabin.

12. The assembly as defined in claim 11, wherein the first and second elongated portions of the curtain rail and the first and second parts of the curtain track are arcuate when viewed in the plane perpendicular to the longitudinal direction.

13. The assembly as defined in claim 1, wherein the curtain rail and a curtain track defined therein slidingly engaging the curtain are curved when viewed in a plane perpendicular to a longitudinal direction of the aircraft cabin.

14. The assembly as defined in claim 13, wherein the curtain rail and curtain track are arcuate when viewed in the plane perpendicular to the longitudinal direction.

* * * * *